(No Model.)
V. D. DEARBORN.
Shutter Fastener.
No. 234,000.            Patented Nov. 2, 1880.
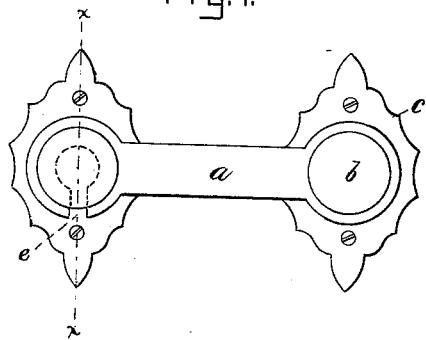
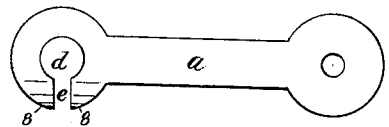     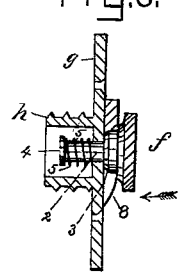
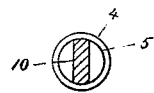    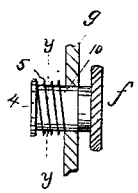    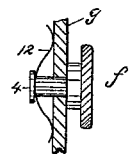
WITNESSES                          INVENTOR
Arthur Reynolds                      Vasco D. Dearborn.
L. F. Connor

UNITED STATES PATENT OFFICE.

VASCO D. DEARBORN, OF BOSTON, MASSACHUSETTS.

SHUTTER-FASTENER.

SPECIFICATION forming part of Letters Patent No. 234,000, dated November 2, 1880.

Application filed September 13, 1880. (No model.)

*To all whom it may concern:*

Be it known that I, VASCO D. DEARBORN, of Boston, county of Suffolk, State of Massachusetts, have invented an Improvement in Shutter-Hooks, of which the following description, in connection with the accompanying drawings, is a specification.

This invention relates to shutter-hooks, and has for its object such a construction thereof, substantially as hereinafter described, as to permit the same to be locked when closed and to avoid rattling.

My invention consists in a shutter-hook having a notched bar which engages or hooks over or upon a spring-held stud that serves to lock the bar at its notched end and prevent that end rattling.

Figure 1 represents, in plan view, a shutter-hook containing my improvements, the hook being shown as engaged or locked as it will be when the shutter is closed. Fig. 2 shows the bar removed; Fig. 3, a vertical section on the line $x\,x$, Fig. 1; Figs. 4 and 5, a section and side view of a modified form of stud, and Fig. 6 a modified form of spring.

The notched bar $a$, forming the connecting link or medium for the shutter-hook, pivoted at its rear end, as usual, upon the bolt $b$, secured to or held by the foundation $c$, all in any usual way, has its front end notched, as at $d\,e$, to engage the shank of the spring-held stud $f$, forming that part of the shutter-hook which is to co-operate with the notched bar $a$ when the hook is operative to hold the shutter closed.

The stud $f$ has a large outer head, preferably beveled at its under side, as shown in Fig. 3, the said beveled portion 3 being sufficiently reduced in diameter to enter the round recess $d$ at the free end of the bar when the said recess is brought into position below it, the spring 5 about the shank 2 of the stud, and bearing at one end against the head 4 of the said shank, and at its other end against the rear side of the base-plate $g$, drawing the stud in the direction of the arrow near it in Fig. 3.

The part $e$ of the notch of the bar is a little wider than the diameter of the shank 2, so as to pass over it as the beveled ends 8 of the bar each side the slot $e$ are pressed under the head of the stud in the act of engaging the bar with the stud $f$ to fasten or close the shutter-hook, the stud $f$ at such time being, by the inclines 8, drawn outward in opposition to the pressure of the spring 5, and the latter, as soon as the recess $d$ comes under the beveled portion 3, causes the said beveled portion to enter the said recess and lock the bar.

That part of the under side of the head of the stud $f$ which is larger in diameter than the portion 3 presses against the outer face of the hook, as shown in Fig. 3, and prevents the usual lateral vibration of the hook upon the stud, which produces the rattling noise so common to shutter-hooks.

The base-plate $g$, if made flat, as in Fig. 3, will have at its rear side a screw-threaded hollow hub, $h$, to be screwed into an upright of the shutter or other thing upon which the said plate and stud are to be attached. The plate $g$ may also be provided with screw-holes, as usual.

Instead of having the under side of the head circular, as at 3, I may flatten it, as at 10, Figs. 4 and 5, the portion 10 being just narrow enough to pass through the slot $e$ of the hook; and when the said part 10 reaches a position within the larger opening, $d$, the stud may be rotated one-fourth around, and the part 10 be made to stand at right angles to the slot $e$.

Instead of employing a spiral spring, as in Figs. 3 and 5, I may employ a flat spring, 12, as in Fig. 6.

This device may be used to fasten shutters or doors of any sort, and may be made of any metal which is usually employed for shutter-hooks.

I claim—

1. As an improved article of manufacture, a shutter-hook composed in part of a pivoted slotted bar and a spring-held stud to engage and hold the slotted part of the bar, substantially as described.

2. In a shutter-hook, the pivoted bar notched as shown at $d\,e$, and beveled at its end next to the notch $e$, combined with the yielding spring-held stud $f$ and its holding-plate, the said stud at the under side of its head being adapted to enter the notch or recess $d$ of the bar and prevent it from being disengaged from the said stud, substantially as described.

In testimony whereof I have signed my name to this specification in the presence of two subscribing witnesses.

VASCO D. DEARBORN.

Witnesses:
N. E. C. WHITNEY,
W. H. SIGSTON.